United States Patent
Jouffroy et al.

(10) Patent No.: US 9,139,272 B2
(45) Date of Patent: Sep. 22, 2015

(54) INTERNALLY ACTUATED AUTONOMOUS SAILING BUOY

(71) Applicant: Kasper Mayntz Paasch, Sonderborg (DK)

(72) Inventors: Jerome Jouffroy, Soenderborg (DK); Kasper Mayntz Paasch, Sonderborg (DK); Lin Xiao, Soenderborg (DK)

(73) Assignee: KASPER MAYNTZ PAASCH, Sonderborg (DK)

( * ) Notice: Subject to any disclaimer, the term of this patent is extended or adjusted under 35 U.S.C. 154(b) by 0 days.

(21) Appl. No.: 14/355,324

(22) PCT Filed: Oct. 31, 2012

(86) PCT No.: PCT/DK2012/050402
§ 371 (c)(1),
(2) Date: Apr. 30, 2014

(87) PCT Pub. No.: WO2013/064155
PCT Pub. Date: May 10, 2013

(65) Prior Publication Data
US 2014/0283725 A1    Sep. 25, 2014

(30) Foreign Application Priority Data
Nov. 1, 2011    (DK) .................................. 2011 00845

(51) Int. Cl.
*B63C 9/08*    (2006.01)
*B63H 9/06*    (2006.01)
*G05D 1/08*    (2006.01)
*B63B 3/38*    (2006.01)
(Continued)

(52) U.S. Cl.
CPC ................ *B63H 9/0607* (2013.01); *B63B 3/38* (2013.01); *B63B 22/00* (2013.01); *B63B 35/00* (2013.01); *B63B 39/02* (2013.01); *B63H 25/00* (2013.01); *G05D 1/0875* (2013.01)

(58) Field of Classification Search
USPC ............................. 114/124, 144 E; 441/1, 24
IPC ............................................... B63B 39/02,22/20
See application file for complete search history.

(56) References Cited

U.S. PATENT DOCUMENTS 3,985,106 A * 10/1976 Ross .............................. 114/91
5,179,905 A * 1/1993 Hossfield et al. ......... 114/144 E
(Continued)

OTHER PUBLICATIONS

International Search Report from International Application No. PCT/DK2012/050402 mailed Apr. 2, 2013.
(Continued)

*Primary Examiner* — Stephen Avila
(74) *Attorney, Agent, or Firm* — Merchant & Gould P.C.

(57) ABSTRACT

A robust mechanical actuation design for an autonomous sailing buoy (1) is disclosed based on an internal actuation system. The buoy (1) consists of a simple closed body (3) taking the form of a ship hull to which are attached two fixed appendages (2, 4): one rigid wing (4) to catch the wind, and a keel (2). The design is completely rudderless. Steering is performed using only an internal actuation system. This system includes a moving mass system (5, 6, 7), a processing unit (9), and a navigation unit (8). The navigation unit (8) consists of a GPS, accelerometers and gyroscopes, and a wind direction and velocity sensor. The processing unit (9), using information given by the navigation unit (8), automatically controls the moving mass (6) to hold the buoy (1) on a desired course.

11 Claims, 5 Drawing Sheets

(51) Int. Cl.
*B63B 22/00* (2006.01)
*B63H 25/00* (2006.01)
*B63B 35/00* (2006.01)
*B63B 39/02* (2006.01)

(56) References Cited

U.S. PATENT DOCUMENTS

| | | | | |
|---|---|---|---|---|
| 5,362,263 A | * | 11/1994 | Petty | 440/1 |
| 5,392,727 A | * | 2/1995 | Christensen et al. | 114/91 |
| 5,410,977 A | * | 5/1995 | Webb | 114/91 |
| 5,560,310 A | * | 10/1996 | Christensen et al. | 114/91 |
| 5,622,130 A | * | 4/1997 | Calderon et al. | 114/39.21 |
| 2010/0131133 A1 | * | 5/2010 | Koda et al. | 701/21 |
| 2014/0311393 A1 | * | 10/2014 | van der Tempel et al. | 114/124 |

OTHER PUBLICATIONS

Neal, "A Hardware Proof of Concept of a Sailing Robot for Ocean Observation", *IEEE Journal of Oceanic Engineering, vol. 31, No. 2,* 2006, pp. 462-469, Apr. 2006.

* cited by examiner

INTERNALLY ACTUATED AUTONOMOUS SAILING BUOY

This application is a National Stage Application of PCT/DK2012/050402, filed 31 Oct. 2012, which claims benefit of Ser. No. PA 2011 00845, filed 1 Nov. 2011 in Denmark and which applications are incorporated herein by reference. To the extent appropriate, a claim of priority is made to each of the above disclosed applications.

FIELD OF THE INVENTION

The present invention relates generally to monitoring ocean buoys and to an autonomous buoy that can go on site by itself and stay there using the wind as its sole means of propulsion, thereby removing deployment costs. The invention related more particularly to a buoy consisting of a single rigid body for the envelope, and an internal actuation system which increases the life of the autonomous buoy, requiring very little maintenance.

BACKGROUND OF THE INVENTION

Monitoring the oceans is a matter of primary importance, not only for ongoing research related to global warming, but also for other activities such as oceanographic studies, the fishing industry, and military operations. For many of them, a number of different parameters such as temperature, salinity, wind speed and direction, wave height, are regularly measured over time and at different locations around the globe. Among the means available to obtain these measurements, buoys that gather and send data are widely used in observation and monitoring programs.

Existing buoys currently used for weather monitoring, acoustic transmission, etc. either require mooring lines to stay on site, or are allowed to drift away. Furthermore, in all cases, they need to be deployed by ships, thus implying a significant cost due to deployment alone. Whenever needed, maintenance is also another task which can be quite costly.

In the ocean engineering community, self-deployment and re-deployment was already considered in the form of autonomous self-propelled platforms, usually small robotic ships equipped with a propellers and thrusters. However, these solutions typically need a lot of energy and their batteries have to be re-charged quite often, thus limiting their life expectancy.

Instead of using propellers, it was also considered to resort to older means of sea transportation, whereby the wind would play a crucial role, and a number of robotic sailboats were built. The problem, in this case, and for monitoring platform applications such as data buoys, is that the appendages of the boats, i.e. the sails and the rudder, can after some time and harsh conditions be damaged by the marine environment, resulting again in a relatively short life expectancy.

If one considers the rudder, steering a sailboat without the aid of a rudder is not a new concept. The sailboard and all multi-masted craft are capable of being steered by their sails alone. In cases where the rudders of multi-masted craft have been damaged, the skipper's only means of steerage has been by properly trimming the sails to alter the balance between the aerodynamic and hydrodynamic forces. Likewise, the sailboard alters the balance between the aerodynamic and hydrodynamic forces by pivoting a single sail forward or backward over the center of lateral resistance of the keel. The rudderless sailboat offers yet another choice for the sports minded sailor. While the sailboard also uses a rudderless method of sailing, it is somewhat difficult to master and requires physical stamina and a good sense of balance. By contrast, the rudderless sailboat is easy to master and requires little effort to operate. However, all these examples still contain external moving parts (the sails, the keel or the mast) and are therefore not suited to longstanding operations in a sometimes extreme environment.

Mark Neal (IEEE Journal Of Oceanic Engineering, April 2006,Vol. 31, No. 2, pages 462-469) discloses an autonomous sailing buoy (sailing robot) comprising a buoy body taking the form of a simple boat hull and made from a robust material, a keel is attached to the bottom of the sailboat, a rigid sail (rigid wing) having a position along the plane between the front and aft of the buoy body. Neal further discloses a navigation unit (wind indicator potentiometer) and processing unit (main controller), where the processing unit (main controller) used for receiving and processing data from said navigation unit (wind indicator potentiometer).

The prior art does not disclose a buoy based on a sail boat without a rudder, and with a moving mass system inside the buoy body, and wherein the processing unit is connected to the moving mass system and said navigation unit, whereby it controls the moving mass system to hold the buoy on a specific course.

It is an object of the present invention to provide a buoy to go on site by itself and stay there, thereby removing the deployment costs. In addition, it is an object to provide a buoy that can go on site without the need of any fuel and without any moving parts extending from the buoy body. This will increase the life expectancy of such an autonomous buoy, requiring very little maintenance.

SUMMARY OF THE INVENTION

The above objects have been solved by the present invention, which is based on a new sailing buoy design/technology platform that can be steered without any external moving part, such that resistance to harsh weather is significantly increased.

The buoy body is similar to a sailing yacht in the sense that it has two appendages, one to catch the wind, and playing the role of a sail, one playing a role similar to the rudder. However, contrary to a sailboat, both of these appendages are completely rigid and fixed, i.e. not actuated. This allows our sailing buoy to have no external moving part, and the inside of the buoy can be totally and easily isolated from the harsh marine environment, thus increasing significantly its life expectancy. To make steering possible an automatic moving mass system inside the buoy replaces the standard "articulated" rudder and sail.

This new type of buoy body could be used for different applications, and considerably decrease the cost of deployment/re-deployment. In addition, this could generate new applications, such as dormant surveyors in the military world, for example. The self-deployment feature decreases operational costs compared to traditional data buoys and full internal actuation induces very little maintenance compared to currently available surface autonomous vehicles. The operating costs are thus lowered significantly.

Specifically the present invention provides an autonomous sailing buoy comprising:
- A buoy body taking form of a rudderless sailboat and made from a robust material, such as fibre glass or aluminium;
- A keel attached to the bottom of the sailboat;
- A sail having a fixed position extending in the plane between the front and aft of the buoy body;
- A moving mass system inside said buoy body;

A navigation unit placed on said buoy body and consisting of necessary sensors for navigation purposes (GPS, accelerometers, gyroscopes, wind velocity and direction sensors); and A processing unit connected to the moving mass system and said navigation unit, said processing unit used for receiving and processing data from said navigation unit, whereby it controls the moving mass system to hold the buoy on a specific course. Hence the data received from the navigation unit are entered in the processing unit that controls a mechanism, which moves the moving mass (e.g. with a hydraulic piston as in a boat autopilot).

In one preferred embodiment the moving mass system inside said buoy body is based on a block of fixed mass moving along the transverse plane of the buoy.

In a further embodiment the present invention, the moving mass system consists of a conventional anti-rolling tank that can be filled and emptied with a ballast fluid.

DETAILED DESCRIPTION OF THE INVENTION

Figure 1:
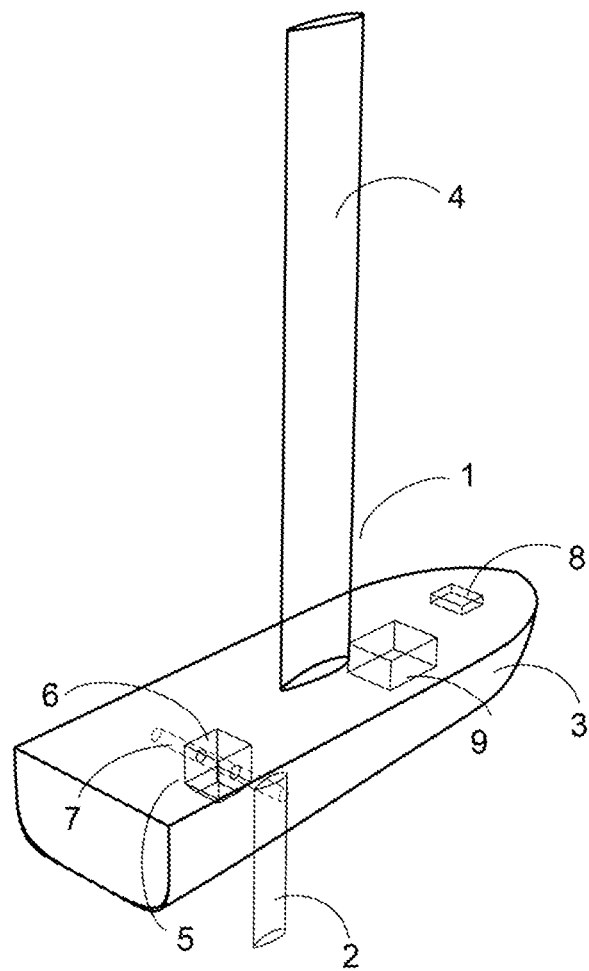
FIG. 1 is a schematic perspective view of the sailing buoy of the present invention, wherein a moving mass system is responsible for steering.
Figure 2:
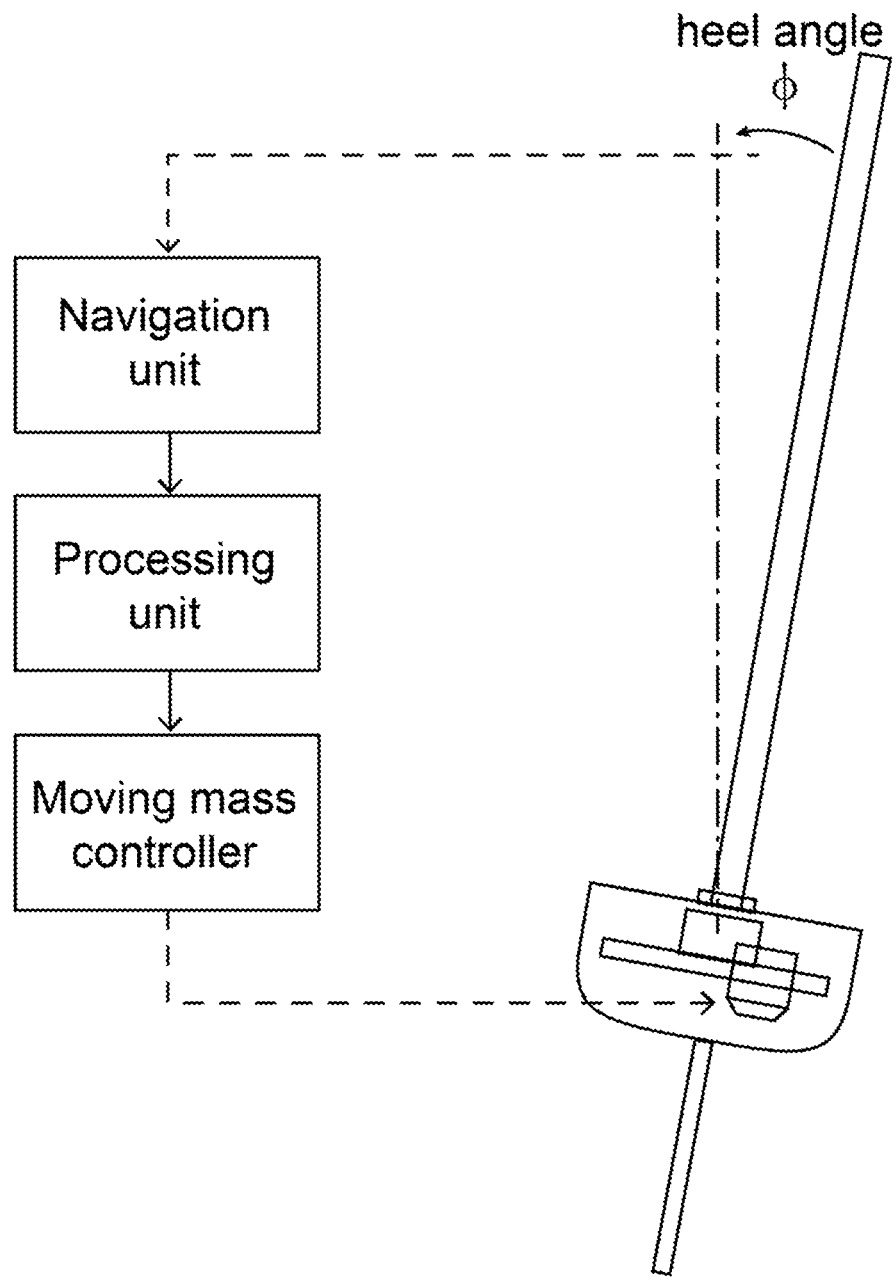
FIG. 2 is a schematic of a control system for automatically adjusting the moving mass system to obtain the desired heel angle.
Figure 3A:
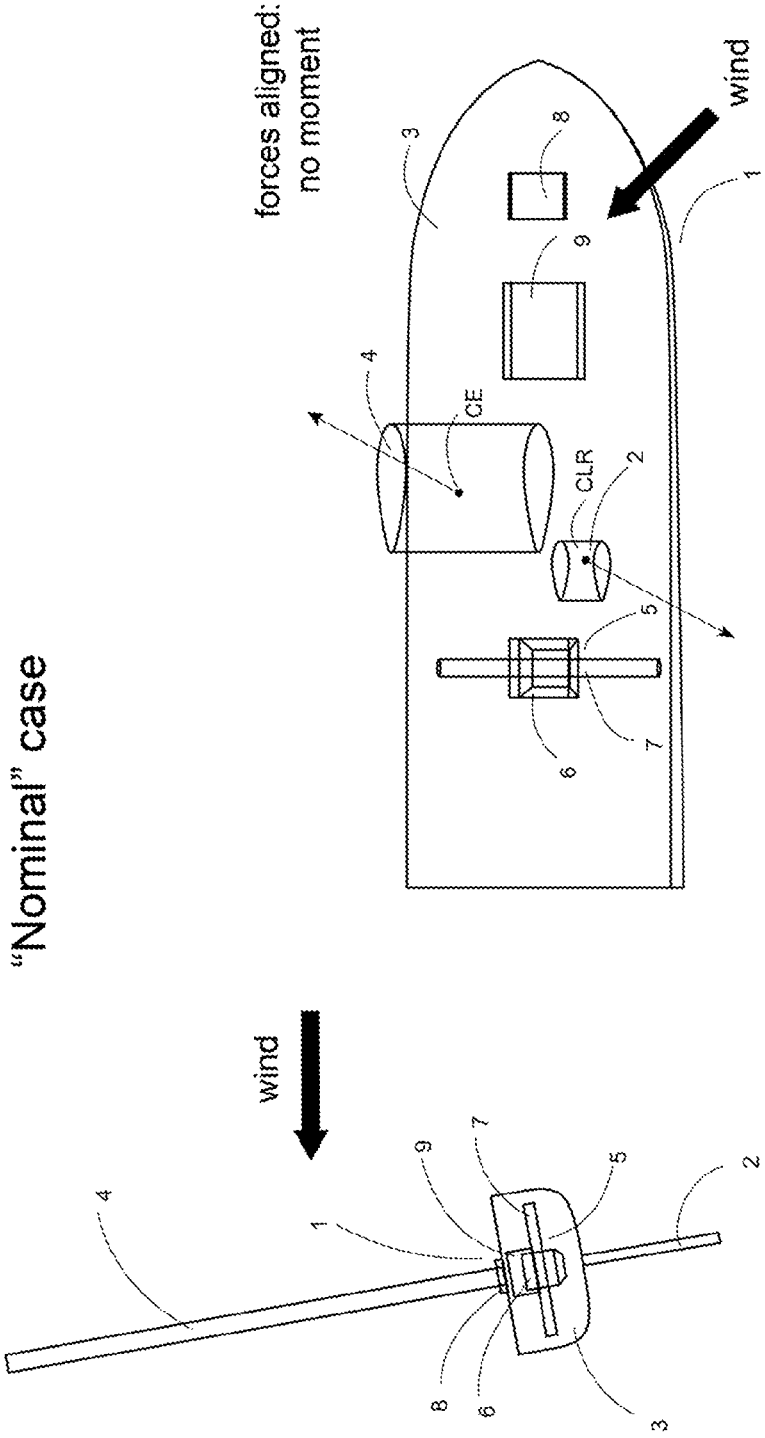
FIG. 3A shows stern and top views of the sailing buoy where the mass actuation system is set such that the aerodynamic and hydrodynamic forces result in no turning moment.
Figure 3B:
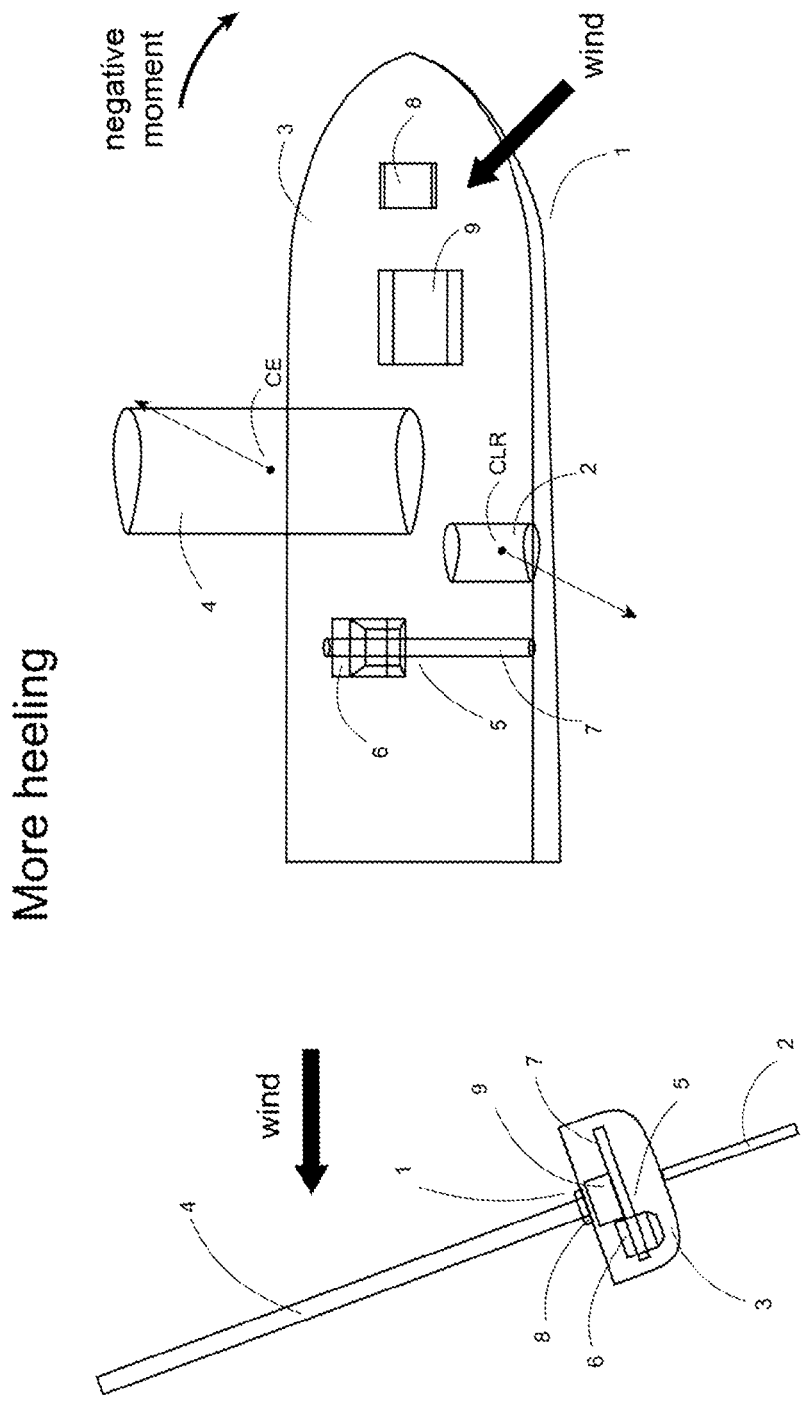
FIG. 3B show stern and top views of the sailing buoy where the moving mass system is set such that the aerodynamic and hydrodynamic forces result in a clockwise turning moment on the sailing buoy.

Referring to FIGS. 1 and 3A-B-C, the autonomous internally actuated sailing buoy is shown generally at 1. The buoy includes a keel 2 attached to the hull or buoy body 3, and a fixed rigid wing 4 for the sail, also attached to the buoy body 3. Since the keel 3 and the wing 4 have both a fixed position along the length of the body buoy, they can either be attached rigidly to the body buoy 3, or the three objects 2, 3 and 4 can be made together as a single rigid closed object, thus keeping the number of openings in the buoy body to a minimum and decreasing the need for water-proof joints. In order to make steering possible an automatic moving mass system 5 inside the buoy replaces the standard "articulated" rudder and sail. The moving mass system 5 is based on a mass 6 movable on a track 7 along the transversal plane of the sailing buoy 1, and acts directly on the heel angle of the buoy (see FIG. 2). Another way to change the mass distribution of the sailing buoy 1 is to change the mass system 5 with a conventional anti-rolling system in the form of a U-tank. With any one of these systems, the heel angle is measured by a navigation system 8 situated on an opening on the buoy body necessary for a GPS and a wind sensor to operate. This information is then passed to the processing unit 9, which contains the control algorithms of the buoy, and which then compares the measured heel angle to a desired heel angle. A control order is then issued to the moving mass system 5 through the so-called Moving-mass controller, unit integrated to the moving mass system 5, in order to move mass 6 along supporting rod 7 to obtain a heel angle equal to the desired heel angle.

Figure 3C:
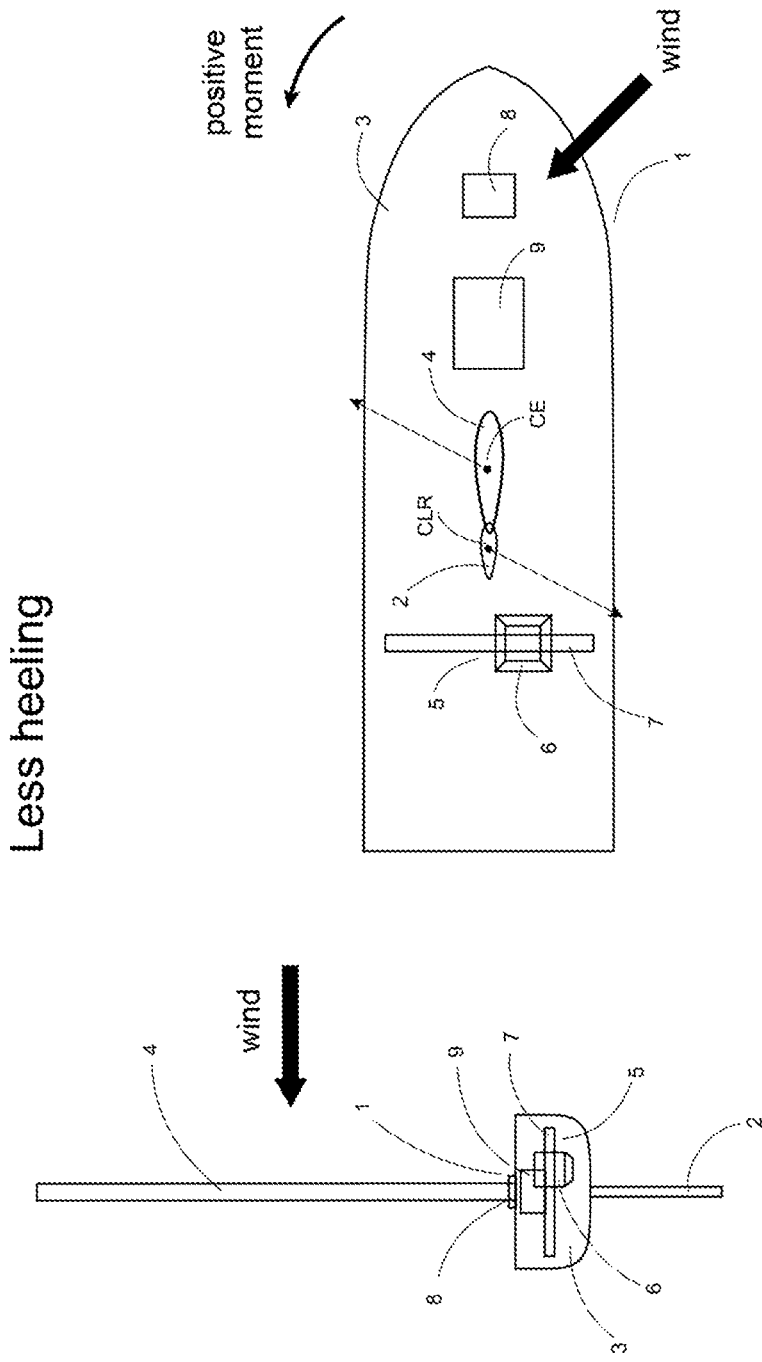
FIG. 3C show stern and top views of the sailing buoy where the moving mass system is set such that the aerodynamic and hydrodynamic forces result in a counter clockwise turning moment on the sailing buoy.

Referring now to FIGS. 3A, 3B and 3C, the principle of steering the sailing buoy only using the moving mass system can be presented. First referring to FIG. 3A and assuming a wind coming from starboard, the action of the wind on the sailing buoy 1 results in an aerodynamic force on the rigid wing 4 extending from the center of effort (CE) and a hydrodynamic force of equal magnitude on the keel 2 extending from the center of lateral resistance (CLR). The mass 6 is placed in such a way that these two forces are situated on a common vertical plane (the two forces are seen as aligned in the top view) and therefore no yaw moment is created. Referring to FIG. 3B, the moving mass is now placed so as the increase heeling further, and thereby moving horizontally the CE and the CLR further away from each other. Since the direction of the two forces do not change, these two forces do not lie anymore in the same vertical plane, and a lever arm appear between the two forces, which in turn creates a horizontal and clockwise or positive moment on the sailing buoy, steering it to starboard. Inversely, and referring now to FIG. 3C, by changing the position of the mass 6 to obtain less heeling, the CE and the CLR are this time brought closer to each other. Here again, the two forces do not lie on the same vertical plane, inducing this time a counter-clockwise or negative moment, resulting in the sailing buoy being steered port.

REFERENCES CITED

U.S. Pat. No. 5,410,977
M. Neal "A hardware proof of concept of a sailing robot for ocean observation", IEEE Journal of Oceanic Engineering, vol. 31, no. 2, April 2006.

The invention claimed is:

1. An autonomous sailing buoy comprising:
a buoy body taking form of a simple boat hull;
a keel attached to the bottom of the buoy body;
a sail having a fixed position extending in the plane between the front and aft of the buoy body;
a moving mass system inside said buoy body, which enables a mass to be moved along the transverse plane of the buoy, thereby controlling the course of the buoy;
a navigation unit; and
processing unit connected to the moving mass system and said navigation unit, said processing unit used for receiving and processing data from said navigation unit, whereby the processing unit controls the moving mass system to hold the buoy on a specific course.

2. Autonomous sailing buoy according to claim 1, wherein the moving mass system inside said buoy body is based on a block movable on a track along the transverse plane of the buoy.

3. Autonomous sailing buoy according to claim 1, wherein the moving mass system inside said buoy body is based on ballast tanks that can be filled and emptied with a fluid.

4. Autonomous sailing buoy according to claim 1, wherein the rudderless sailboat is made from fibre glass.

5. Autonomous sailing buoy according to claim 1, wherein the navigation unit is GPS-based.

6. Autonomous sailing buoy according to claim 1, wherein processing unit is a marine auto-pilot.

7. Autonomous sailing buoy according to claim 1, wherein the sail is rigid.

8. Autonomous sailing buoy according to claim 1, wherein the buoy is made from a robust material.

9. Autonomous sailing buoy according to claim 8, wherein the robust material comprises fibre glass.

10. Autonomous sailing buoy according to claim 8, wherein the robust material comprises aluminum.

11. Autonomous sailing buoy according to claim 3, wherein the fluid comprises water.

\* \* \* \* \*